US005271810A

United States Patent [19]

Keyser et al.

[11] Patent Number: 5,271,810

[45] Date of Patent: Dec. 21, 1993

[54] DISTILLATION DEVICE FOR PURIFYING LIQUID MIXTURES

[75] Inventors: Gene E. Keyser; Robert L. Klopfenstein, both of Jacksonville, Fla.

[73] Assignee: Environmental Solvents Corporation, Jacksonville, Fla.

[21] Appl. No.: 901,531

[22] Filed: Jun. 19, 1992

Related U.S. Application Data

[62] Division of Ser. No. 699,935, May 14, 1991, Pat. No. 5,156,173.

[51] Int. Cl.[5] ............ B01D 3/10

[52] U.S. Cl. ............ 202/185.2; 202/170; 202/181; 202/182; 202/193; 202/196; 202/205; 203/1; 203/91; 203/98; 203/DIG. 14; 261/76; 261/DIG. 75

[58] Field of Search ............ 202/185.2, 170, 205, 202/182, 181, 160, 185.3, 193, 196; 159/DIG. 16; 203/91, 98, 1, 2, 14, DIG. 14, DIG. 18

[56] References Cited

U.S. PATENT DOCUMENTS

| | | | |
|---|---|---|---|
| 2,151,547 | 3/1939 | Auerbach | 261/DIG. 75 |
| 3,106,928 | 10/1963 | Rand | 202/170 |
| 3,584,674 | 6/1971 | Nolan | 202/188 |
| 3,733,060 | 5/1973 | Merritt | 261/DIG. 54 |
| 3,852,409 | 12/1974 | Martin et al. | 55/59 |
| 4,349,358 | 9/1982 | Tarancon | 261/151 |
| 4,595,460 | 6/1986 | Hurt | 202/185.2 |
| 4,738,695 | 4/1988 | Carr et al. | 55/84 |
| 4,929,312 | 5/1990 | Westcott | 202/170 |
| 5,082,012 | 1/1992 | Massey et al. | 202/170 |
| 5,116,515 | 5/1992 | Selesnick | 210/744 |
| 5,135,684 | 8/1992 | Mohn et al. | 261/DIG. 75 |
| 5,156,173 | 10/1992 | Keyser et al. | 202/185.1 |

*Primary Examiner*—Virginia Manoharan
*Attorney, Agent, or Firm*—Cesari and McKenna

[57] ABSTRACT

A distillation device for separating a liquid mixture from contaminants contained therein. The device partially cools, using an air radiator or equivalent passive heat-exchange device, a fluid of that contains at least one component of the mixture to be separated; the temperature of the fluid does not fall the ambient air temperature, thus preventing condensation on the heat exchanger. The partially cooled fluid is introduced into an aspirator and combined therein with a gaseous stream produced by heating the mixture to boiling in a separate chamber. Because of the high surface area of contact between vapor and aspirated liquid, the heat transfer is completely effective to condense the gaseous mixture, which settles into a pool. The components can then be separated mechanically or by gravity.

7 Claims, 2 Drawing Sheets

DISTILLATION DEVICE FOR PURIFYING LIQUID MIXTURES

RELATED APPLICATION

This is a division of U.S. Ser. No. 07/699,935, filed May 14, 1991, now U.S. Pat. No. 5,156,173.

BACKGROUND OF THE INVENTION

A. Field of the Invention

The present invention relates to apparatus for cleaning soiled articles, and more specifically to a high-efficiency immersion cleaning apparatus for removing grease and the like from metal, ceramic or glass articles.

B. Description of the Related Art

A wide variety of manufactured items acquire layers of grease or other contaminants during fabrication, storage or use. Such items include printed circuit boards, electronic components, machined metal parts and assemblies, and components fabricated from plastic, glass and ceramic materials. In order to maintain the usefulness of these items, they must be periodically (or at least initially) rendered free of contaminants.

One traditional method of cleaning manufactured articles is vapor degreasing. This process involves suspension of the soiled article in a dense vapor generated by boiling one of numerous commonly used degreasing solvents. This suspension in solvent vapor may be accompanied by one or more immersion steps.

During suspension in the vapor, the solvent vapor condenses on the relatively cool soiled article, dissolving and rinsing away soluble contaminants along with entrained non-soluble contaminants. The article absorbs the solvent's heat of vaporization until its surface temperature approaches that of the solvent vapor. At this point, equilibrium is established between the wet article surface and the surrounding vapor, and further condensation ceases. The article may then be removed from the vapor, largely free of both soil and excess surface solvent, and ready for further processing. Degreasing apparatus that provide for subsequent immersion steps may also include ultrasonic transducers to promote mechanical and hydraulic solvent action, producing a scrubbing effect that frees recalcitrant or otherwise inaccessible contaminant.

Conventional degreaser designs feature a housing that contains a boiling sump to generate the solvent vapor, and a series of cooling coils located toward the top of the housing that continuously condense the rising vapors. This action both preserves solvent and prevents environmentally hazardous rates of solvent-vapor emission. Before the condensate is returned to the boiling sump (or immersion basin, if the device is so equipped), it usually passes through a separation device that removes water acquired by the vapor and cooling coils from the surrounding atmosphere.

These conventional degreaser designs present a number of limitations. First, the condensing coils are rarely sufficient to completely prevent the escape of solvent from the device; because some of the traditional degreasing solvents (particularly chlorofluorocarbons) are now known to be environmentally hazardous or toxic to workers, the range of usable solvents has been considerably restricted in recent years. Furthermore, even accepting the inevitability of environmental release of solvent vapor, the rate of condensation must be operationally practical; excessive solvent loss can raise the cost of cleaning considerably. Therefore, refrigeration or a source of cooling water must often be provided to achieve sufficient condensation, and such features both increase the cost of operating the device and limit the amount of solvent that can feasibly be recycled.

The energy consumption necessary for cooling is increased further by the tendency of coils to condense atmospheric moisture into films on their exterior surfaces. This condensate acts as an additional layer of insulation, interfering with the efficient flow of heat and therefore increasing the energy input necessary to achieve a given degree of cooling. The problem affects not only vapor degreasers, but any type of condensing apparatus exposed to the atmosphere. This is a particular drawback in distillation apparatus, which are often used in conjunction with vapor degreasers, due to the intimate contact between the coils and the vapor that is usually necessary for effective condensation after separation.

The risk of combustion is another factor associated with many otherwise efficacious solvents that limits their usefulness with traditional vapor degreasers. Without complicated level-control sensors and associated valves, the amount of solvent within the boiling sump can decline to the point of exposing the heater, thus permitting direct contact between the heater and easily ignited solvent vapor. The danger is increased by the need for conventional degreasers to remain open to the atmosphere, permitting the entry of oxygen into the solvent-vapor zone that increases the susceptibility of the vapor to ignition.

DESCRIPTION OF THE INVENTION

A. Brief Summary of the Invention

The present invention addresses the problem of vapor emissions in a number of ways. First, the amount of solvent actually evaporated is minimized by continuous recycling. Our apparatus can be configured to separate the cleaning process into immersion and rinsing steps, yet retain all of the benefits of traditional vapor degreasing. In this configuration, the soiled article is first immersed in a chamber containing a solvent which is at least somewhat nonpolar (typically a hydrocarbon) and which has a relatively high boiling point. This solvent is warmed only to a moderate temperature, e.g. 45° C., to minimize its vapor pressure while providing adequate cleaning energy.

Second, although the apparatus is configured with a completely open, unrestricted top, two features prevent significant emission of solvent vapor into the atmosphere. The first is a continuous source of inert gas that is introduced into the apparatus over the periphery of its housing, and the second is a solvent vapor-withdrawal and recycling system. These two features, combined with relatively low process temperatures for one of the solvents, produce a vapor gradient from nearly pure solvent vapor at the surface of the solvent pool to nearly pure inert gas at the top of the apparatus housing. In addition, the inert-gas source and vapor-withdrawal system combine to maintain a relatively constant vapor temperature, thereby significantly reducing the chance of spontaneous ignition.

The vapor-withdrawal system draws gaseous solvent and inert gas into a high-efficiency condensation assembly. The heart of our condensation system is a centrifugal separating device that is employed as a condenser. As far as we are aware, these devices have heretofore been used primarily to remove solid particles from a gas stream. Our use of a centrifugal separator to replace the traditional coil-type condenser provides greatly enhanced condensation efficiency. The high interior surface area of a centrifugal separator promotes high absolute rates of condensation, and the efficiency of this device eliminates the need to operate at temperatures that would cause the buildup of moisture along its exterior; moisture buildup is a well-known limitation of coil-type condensers that interferes with efficient heat transfer, and therefore requires increased input of energy in the form of excess cooling capacity.

Inefficiency in condensation is frequently an operational concern in conventional devices where excess solvent is condensed for disposal, because uncondensed vapor is typically released into the environment; in such devices, inefficient or ineffective condensation results in excessive atmospheric emission. This is not a concern with the present invention, since recirculation of all process components eliminates the need for atmospheric discharge; the return of some uncondensed vapor to the cleaning chamber has no effect on performance. Of course, efficiency of operation remains a consideration from an economic perspective, and the present invention requires minimal input of energy to condense and recycle evaporated solvent.

The invention also includes an integrated series of inexpensive, simple level-control features. These reduce or eliminate the chances of solvent combustion or other releases into the environment.

The method of our invention utilizes successive immersions in solvents that combine azeotropically to remove both polar and nonpolar soils. Azeotropic evaporation of the combined solvents from the cleaned article not only minimizes heat loss, but also allows the bulk of the more flammable solvent to be maintained at a safe temperature well below its flash point; only the relatively small amount of flammable solvent transported with the article to the rinsing solvent is raised to the azeotropic boiling temperature. After immersion and rinsing, the article is dried in the heated vapor gradient.

We have also designed a high-efficiency still for purifying the immersion solvent of our cleaning apparatus while avoiding environmental release; of course, this still is suitable for many uses other than in conjunction with the present invention. Once again, we have eliminated the need for conventional condensation coils, which are subject to the drawbacks discussed above. Our approach is to partially cool, using an air radiator or equivalent passive heat-exchange device, a fluid consisting of at least one component of the mixture to be separated; the temperature of the fluid does not fall below the ambient air temperature, thus preventing condensation on the heat exchanger. The partially cooled fluid is introduced into an aspirator and combined therein with a gaseous stream produced by heating the mixture to boiling in a separate chamber. Because of the high surface area of contact between vapor and aspirated liquid, the heat transfer is completely effective to condense the gaseous mixture, which settles into a pool. The components can then be separated mechanically or by gravity.

Brief Description of the Drawings

The foregoing discussion will be understood more readily from the following detailed description of the invention, when taken in conjunction with the accompanying drawings, in which.

Detailed Description of the Preferred Embodiments p

1. Apparatus Construction

Figure 1:
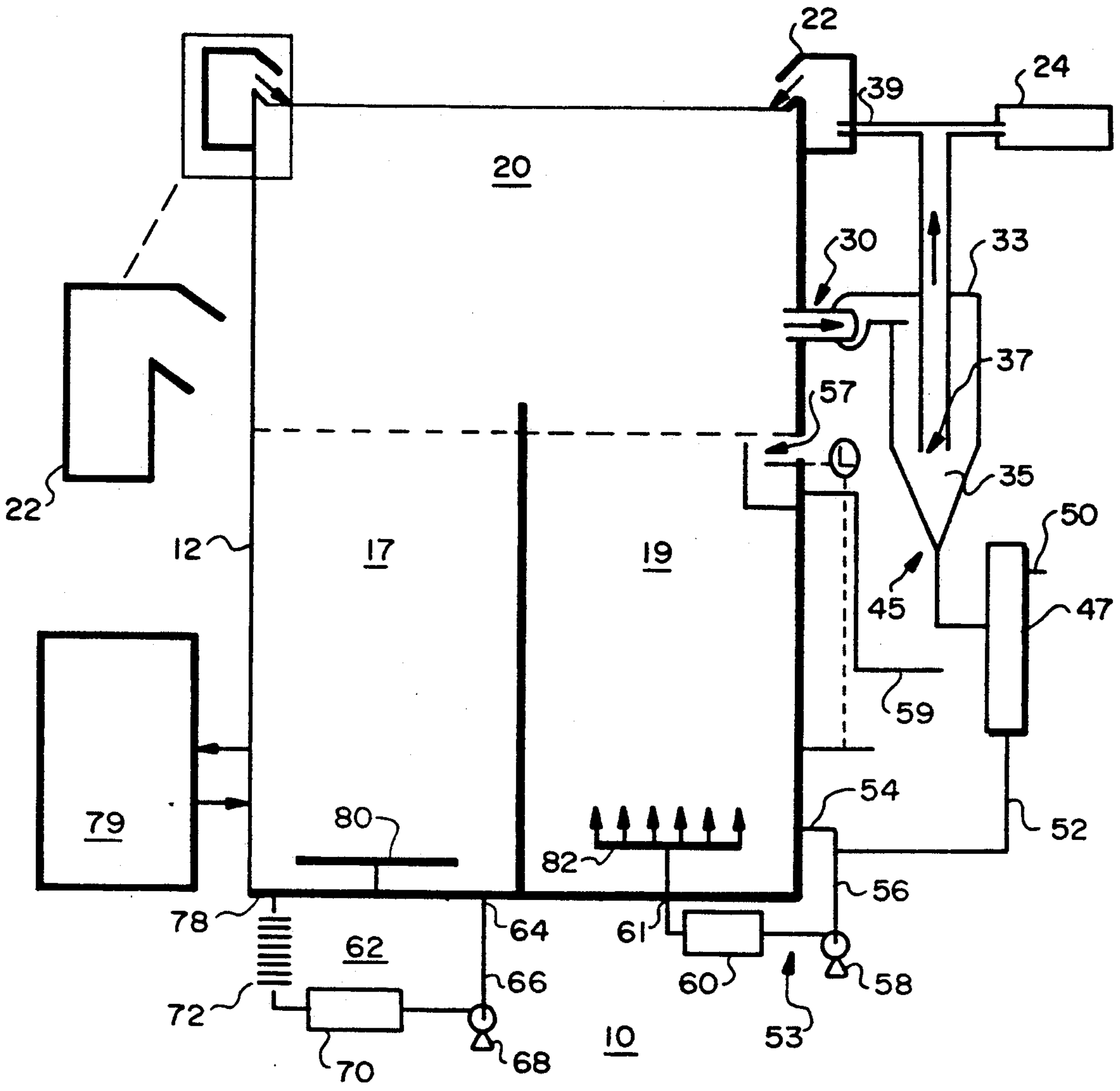
FIG. 1 is a schematic depiction of the apparatus of the present invention.

Refer first to FIG. 1, which schematically depicts a cleaning apparatus constructed in accordance with and embodying the invention. The apparatus 12 comprises a housing 12, in which are formed first and second cleaning chambers 17, 19. Each of these chambers contains a different cleaning solvent, as described more fully below. Solvent fumes rising above chambers 17, 19 mix with inert gas to form a vapor zone 20 thereabove.

On at least one (and preferably three) sides of the upper rim of housing 12 is mounted an inlet 22, which receives an inert gas (such as nitrogen or carbon dioxide) from a source 24 and transmits the gas into vapor zone 20. The recirculation velocity from inlet 22 to the vapor withdrawal and separation system described below largely, if not completely, prevents the fumes in vapor zone 20 from emerging from the housing 12 and entering the surrounding atmosphere.

The vapor withdrawal and separation system consists of an outlet 30, which is coupled to a centrifugal separation device 33; this device is used as a dehumidifier (i.e., to condense the collected vapors into liquid form). A fan 30 draws vapor from vapor zone 20 and propels it into the main chamber 35 of the device through an outlet 31; the motive force of fan 30 also increases the internal pressure in chamber 35. As the initially linear velocity of the vapor becomes radial due to the configuration of chamber 35, the vapor and condensate droplets are forced against the walls of chamber 35, thereby facilitating heat transfer across these walls and separating condensate from vapor. Because the swirling vapor is significantly hotter than the atmosphere surrounding separation device 35, heat will flow out of the device, resulting in cooling and condensation of the vapor therein. This is assisted by the increase in internal pressure provided by fan 30. In addition, an external cooling device (such as another fan) can be directed at the exterior of device 35 to assist the transfer of heat. The temperature never falls below that of the surrounding atmosphere, so moisture does not condense on the outside of the device and interfere with heat transfer; this efficiency is increased by the velocity of vapor inside the device.

Accordingly, separation device 33 can, for example, take the form of a cyclone separator, but any centrifugal device having good heat-transfer properties is also suitable. Furthermore, the performance of separation device 33 can be enhanced by adding a venturi throat to outlet 31, which increases the velocity at which vapor enters separation device 33, as well as the pressure through outlet 31. The result is to increase the rate of heat transfer (although not the overall rate of mass transfer) into separation device 33, thereby increasing the rate o condensation therein.

Separation device 35 contains two outlets. The opening of the first, shown at reference numeral 37, extends from a point near the middle of chamber 35, and is coupled to the channel 39 that joins gas source 24 with inlet 22. The position of opening 37 is below the point at which the incoming vapor is maximally condensed against the wall of chamber 35; therefore, any gas remaining at this point will be the inert gas introduced via inlet 22, uncondensed vapor or a mixture thereof, but in any case will contain no condensate. As stated above, all condensate is recycled rather than emitted. Any uncondensed vapor that exits via outlet 37 is saturated at the elevated pressure within chamber 35; as it enters vapor zone 20, which is maintained at atmospheric pressure, the saturated vapor immediately expands so it is no longer saturated. Thus, the uncondensed vapor returned from separation device 33 is capable of absorbing more solvent vapor in vapor zone 20, and therefore does not adversely affect either the vapor gradient or the vapor-withdrawal system. The coupling between opening 37 and conduit 39 can be provided with a vent 38, which facilitates removal of the air contained in the housing at start-up and, by minimizing diffusion losses, also serves as a means controlling discharge to the environment. To eliminate discharges completely, vent 38 can be coupled to a recycling system such as the still described below.

The second outlet from separation device 33 is shown at reference numeral 45; it conveys condensed fluid from the device into a gravity separator 47. The condensate, containing fractions of both solvents (as well as any particulates that were present in the vapor), is therein allowed to separate by gravity, with the lower-density solvent floating to the top. If the two solvents are at least partially miscible, the gravity separation will be incomplete.

During normal operation of the apparatus, only one of the solvents is maintained at or near its boiling temperature, and therefore the bulk of the vapor in vapor zone 20 consists of this solvent in gaseous form combined with inert gas. A conduit 50 is coupled to gravity separator 47 above the vertical position of solvent boundary to convey the lighter solvent back to chamber 17. A second conduit 52 emerges from the bottom of gravity separator 47, rising to a vented overflow 52*a*, the height of which is determined by the inverse ratio of specific gravities of the two solvents. The overflow returns through filtration loop 54, and re-enters chamber 19. This completes the solvent recycling loop. Conduits 50 and 52 are reversed if the first solvent is denser than the second.

Filtration loop 53 consists of an outlet 54 which leads, via a conduit 56 (to which conduit 52 is also coupled), to a pump 58. Pump 58 moves the solvent conveyed thereto (via conduit 56) through a filter 60, and thereafter back into chamber 19 through an inlet 61. Filter 60 removes bulk solids and particulates from the solvent of chamber 19. The purpose of filtration is to prevent redeposition of soils onto the article being cleaned; consequently, the degree of filtration provided by filter 60 is a design choice that depends primarily on the cost of the solvent in chamber 19 and the inconvenience of its replacement, coupled with cleanliness requirements.

Some of the soils that do not settle to the bottom of chamber 19 float to the top, and are removed by a weir assembly 57 positioned to skim the surface of the solvent and conduct the collected surface material out through a conduit 59. Preferably, pump 58 is sufficiently powerful to drive solvent into chamber 19 with some turbulence, which assists the removal of soil from intricate or tightly packed substrates, and also provides fluid movement that assists the surface-skimming action of weir assembly 57. Overflow capacity to weir 57 is provided from a make-up source of second solvent via inlet 81. Alternatively, conduit 59 may be connected to separator 47 or a separator of similar design.

A similar filtration loop, shown at reference numeral 62, is provided for the solvent in chamber 17. This loop consists of an outlet 64 from chamber 17, a conduit 66 leading to pump 68, a particulate filter 70, a heat exchanger 72 and an inlet 74. Pump 68 draws solvent from chamber 17 and forces it through particulate filter 70 and heat exchanger 72, returning it to chamber 17 through inlet 74. Heat exchanger 72 reduces the temperature of the returning solvent to prevent the heated solvent in chamber 17 from approaching the flash point; accordingly, heat exchanger 72 can include a temperature feedback loop which controls the degree of heat exchange (e.g., by operation of a cooling fan). Once again, filtration requirements are determined by cleanliness standards and particulate levels on incoming soiled parts.

Criticality of these factors may make additional solvent purification desirable. Accordingly, a still 79 may be coupled to chamber 17 and/or chamber 19 (e.g., via outlet 59 and inlet 81) to continuously purify the solvent and return the distilled fraction to its respective chamber.

In operation, a first solvent is introduced into chamber 17, and a second solvent into chamber 19. The first or "immersion" solvent preferably has a high boiling point, and is at least somewhat non-polar. The boiling point of this solvent is generally above 130° C. but less than 250° C., with solvents that boil at temperatures Somewhere within the range 150° to 200° C. being especially preferred. Suitable examples include terpene solvents (including terpene hydrocarbons, terpene alcohols and mixtures thereof), non-halogenated hydrocarbon solvents having a range of flash points, and blends of dibasic esters with hydrocarbons; as discussed below, the characteristics of the present invention also permit use of halogenated solvents. Other suitable solvents include petroleum-based hydrocarbons such as decane, tetradecane, mineral spirits and petroleum-based alcohols such as ethyl hexanol or decanol. The immersion solvent is used to remove non-polar soils, such as oils and greases, which are soluble therein. This solvent is maintained at a temperature well below its boiling point, and also below the boiling point of the other solvent; on the other hand, the temperature should be high enough to promote soil dissolution. Temperatures of approximately 45° C. are generally suitable, and are maintained by a heating fixture 80. If desired, cleaning efficacy can be enhanced by the addition of an ultrasonic or similar mechanical/hydraulic agitation device.

The second or "rinsing" solvent introduced into chamber 19 preferably has a relatively low boiling point compared with the immersion solvent, and is at least somewhat polar. The boiling point of this solvent is preferably at least 50 degrees lower than that of the immersion solvent. The rinsing solvent removes polar soils such as salts, and preferably azeotropes with the immersion solvent or codistills therewith. Water is a preferred rinsing solvent. During operation of the apparatus, the rinsing solvent is maintained at or near its boiling point by a heating fixture 82.

2. Operating Sequence

A dirty article is first introduced into the immersion solvent. Soils soluble in this solvent are removed by dissolution. After a length of time sufficient to facilitate complete dissolution of soluble soils, the article is removed from chamber 17 and introduced into the rinsing solvent in chamber 19. After its removal from the immersion solvent, the soiled article retains a coating of this solvent, which itself contains at least some dissolved soil.

In chamber 19, soils soluble in the rinsing solvent dissolve therein. The immersion solvent remaining on the article disperses in the rinsing solvent or floats to the surface. Soils that were dissolved in the transported immersion solvent will be largely insoluble in the rinsing solvent, and either float to the surface or sink to the bottom thereof. In the former case, they are removed by the weir assembly 57, and in the latter case, by filtration.

The mixture of solvents contained in chamber 19 evaporates azeotropically or codistills, and enters vapor zone 20. Because of the combined effect of constant withdrawal of vapor-saturated inert gas from vapor zone 20 by separation device 33 and introduction of inert gas (with some residual vapor) through inlet 22, vapor zone 20 never reaches an equilibrium point of saturation. Rather, the zone exhibits a concentration gradient from nearly pure solvent vapor at the bottom to nearly pure inert gas at the top. Consequently, after being removed from the rinsing solvent, the article is fully dried by brief suspension near the top of vapor zone 20.

The active removal of vapor and formation of the vapor gradient retard or even eliminate the escape of solvent vapors from the apparatus into the surrounding environment, despite the open-top design. Accordingly, it is possible to achieve environmentally safe use of solvents which, if introduced into the atmosphere, would be considered harmful; examples of such solvents include chlorofluorcarbons and other chlorinated perchloroethylene and 1,1,1-trichloroethane. In addition, the vapor-removal system prevents the temperature of vapor zone 20 from exceeding a definite maximum, allowing further control of the operating temperature and drying rate.

The vapor gradient also helps to maximize the useful life of solvents vulnerable to oxidation. So long as the content of inert gas in the vapor zone 20 is sufficiently high, relatively little oxygen from the surrounding atmosphere enters the vapor zone. This is particularly true at the bottom of the vapor zone, where interaction with solvent would be most problematic, because at this level the inert gas and any stray oxygen are largely displaced by solvent vapor. Another benefit accruing from low oxygen content is reduced risk of solvent combustion.

It is also possible to operate the invention without physically partitioning the two solvents; operation is then similar to that of conventional azeotropic cleaning devices, but with all of the advantages discussed above. Nor is it necessary to use azeotropic solvent mixtures; for example, it is possible to operate the invention with solvent mixtures, in which case the solvent with the lower boiling point is condensed and returned to the solvent basin, or even with a single solvent. In the latter case, the primary benefits derived from the invention's design are low emissions, prevention of combustion, retention of solvent and energy efficiency.

If the solvent drag-out rate, in combination with filtration loop 62, proves too low to preserve the usefulness of the immersion solvent over a sufficient period of time, a still 79 can be added to purify the immersion and/or rinsing solvents during operation of the cleaning apparatus.

Figure 2:
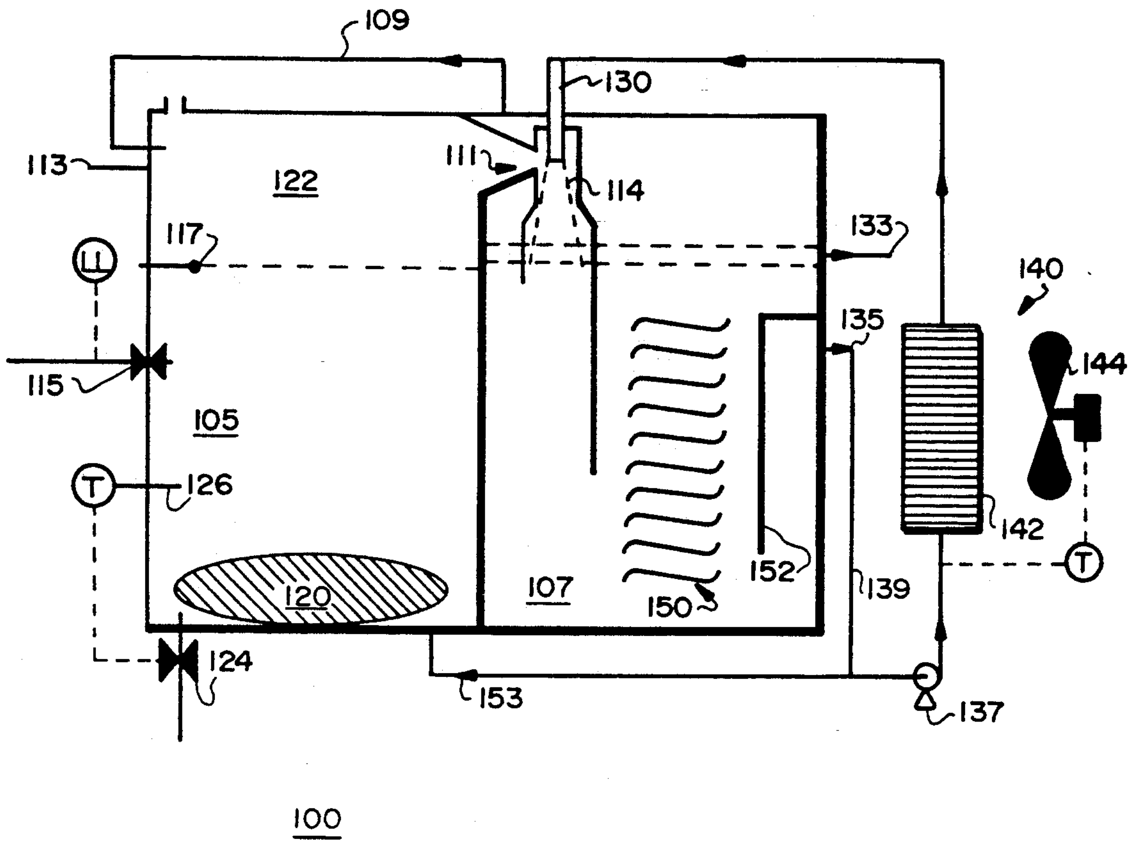
FIG. 2 is a schematic depiction of a preferred form of still for distilling solvent.

The design of still 79 is critical when one or more of the solvents is oxidizable (since purification that involves excessive exposure to air will degrade the solvent), or when soil loading is high enough to require continuous purification. Suitable designs are well-characterized in the art for inert solvents, but not for those which are oxidizable. Accordingly, we have designed our own preferred still assembly, which makes use of an aspirator to achieve particularly advantageous efficiency characteristics, including exclusion of excess oxygen and air. This still is schematically depicted in FIG. 2. As illustrated therein, it comprises first and second partitioned chambers 105, 107, which are directly connected by a pressure equalizing vent 109 and a vapor conduit 111. Conduit 111 leads to an aspirating chamber 114, described in detail below.

Solvent (e.g., from chamber 17 and/or chamber 19 [via weir 57]of the cleaning apparatus described above) is introduced into chamber 105 by an inlet 113. A makeup liquid, such as water, is also introduced into chamber 105, via an inlet valve 115 (which can be fed by chamber 19 or an independent source). Valve 115 can be coupled to a level sensor 117, which reduces or eliminates inflow should the liquid in chamber 105 exceed a predetermined level. Chamber 105 also includes a heating device 120, which heats the solvent/water mixture to the codistillation or azeotropic boiling temperature, thereby producing a zone 122 of solvent vapor above the surface of the solvent/water mixture. (As described below, it is possible to utilize this still in conjunction with solvent mixtures that do not form azeotropes, in which case the mixture is heated to the boiling temperature of the liquid having the lower boiling point.)

The liquid level in chamber 105 is also controlled by a drain valve 124, which can be coupled to a temperature sensor 126 located in chamber 105 some distance above heating device 120. When the temperature is elevated to a predetermined point due to increasing soil concentration, sensor 126 causes drain valve 124 to open and discharge liquid.

The heart of the still is the aspirator, shown at reference numeral 130. This device uses the motive force of a pumped liquid to create a vacuum, which draws vapors into intimate contact with this liquid. When this occurs, the vapors condense. Liquid can be introduced into the aspirator as a stream or in the form of nebulized droplets. The manner in which the liquid is introduced is generally not critical, because the rate of condensation depends primarily on the surface area of the vapor bubble; the liquid will generally surround (and thereby provide sufficient contact area with) the vapor whether the liquid is presented as a stream or in droplets.

Aspirator 130 is fed by one of the solvents (hereafter the "condensing solvent"), and combines this solvent, by means of venturi-induced vacuum, with vapor of a mixture of the two solvents entering through conical conduit 111. Either solvent may serve as the condensing solvent, but this is preferably the material with the higher (or no) flash point.

Contact between the solvent mixture and the condensing solvent results in complete condensation of the former, the condensate being directed downward to the level of the liquid in chamber 107. Preferably, the flow of condensing solvent is contained within a chamber 114 to prevent the turbulence from dissipating excessively into the bulk of chamber 107. The solvent phases separate and, assuming partial immiscibility of the solvents and a density difference therebetween, one solvent floats to the top. The illustrated design assume that the condensing solvent is denser than the other solvent, and this other solvent is recovered through an outlet 133. Obviously, the design can easily be reconfigured to accommodate a condensing solvent that is less dense than the other solvent.

The condensing solvent originates in chamber 107, and is drawn therefrom through an outlet 135. Prior to operation of the still, a predetermined amount of condensing solvent (typically water), sufficient to cover outlet 135, is introduced into chamber 107; a predetermined amount of the solvent mixture is introduced into chamber 105. A pump 137 draws condensing solvent from chamber 107 through outlet 135 and a conduit 139, and then forces it through an air radiator assembly 140. This assembly consists of a passive heat exchanger 142 and a temperature-controlled cooling fan 144, which is directed toward heat exchanger 142. After the condensing solvent emerges from heat exchanger 142, pump 137 forces it through aspirator 130.

It is not necessary for air radiator 140 to cool the condensing solvent excessively; in fact, the temperature of the condensing solvent is preferably kept well above that of the surrounding atmosphere (e.g., at 50° C. or so), thereby eliminating the possibility of moisture condensation on the exterior of heat exchanger 142 and improving separation of the two solvents. Because of the high degree of surface contact promoted by aspirator 130, completely efficient condensation can occur at temperatures much higher than those associated with traditional coil-type distillation units. This feature avoids energy waste associated with such units, wherein moisture films tend to build up around the coils and retard efficient heat transfer, and also keeps to a minimum the energy required by to be dissipated by cooling fan 144.

Several features ensure that the liquid drawn through outlet 135 is primarily, if not wholly condensing solvent. At least a portion of the wall of aspirating chamber 114 extends downward below the surface level of the condensing solvent in chamber 107, thereby blocking movement of the other solvent which penetrates this surface toward outlet 135. A series of baffles 150, as well as a covering baffle 152, further retard the movement of the other solvent toward this outlet. If, however, the other solvent does bypass baffle 152, it is immediately returned to the bulk of chamber 107 via outlet 135, conduit 139, pump 137 and aspirator 130.

Although the operation of the still has been described with respect to combinations of solvents that form azeotropes or codistill, the device is useful with virtually all solvent combinations, so long as the boiling point of the solvent to be recovered is lower than that of the makeup liquid. Furthermore, the still exhibits sufficient energy efficiency to make it attractive for purification of single solvents.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed. For example, it is possible to add redundant flammability safeguards to the cleaning apparatus to enhance safety. These can include an alarm system coupled to a temperature sensor in either of the solvent heating tanks, and/or an oxygen-content sensor in the vapor zone that sounds an alarm or increase the flow of inert gas if the oxygen concentration exceeds a predetermined limit.

What is claimed is:

1. A distillation device for separating first and second liquids that boil azeotropically or codistill, the apparatus comprising:

a. a first chamber for containing a mixture of the first and second liquids;

b. heating means associated with the first chamber for boiling the mixture;

c. a second chamber, partitioned from the first chamber and connected thereto by pressure-equalizing means, for containing a fluid that includes the second liquid;

d. an aspirator coupled to the second chamber;

e. a conduit for withdrawing the fluid from the second chamber and conveying the fluid to the aspirator;

f. means for facilitating communication between the upper region of the first chamber and the outlet of the aspirator, thereby facilitating contact between vapor from the first chamber and fluid ejected from the aspirator;

g. means for cooling the fluid withdrawn from the second chamber before it reaches the aspirator, thereby providing a cooled source of aspirated liquid which makes contact with and condenses vapor from the first chamber; and h. means for withdrawing the condensate of the first liquid from the second chamber, wherein the conduit is disposed with respect to the aspirator so as to create a venturi that withdraws vapor from the first chamber into the aspirator.

2. The apparatus of claim 1 wherein the cooling means is a temperature-controlled air radiator in an atmosphere having a dew point, the temperature of the radiator remaining above the dew point of the atmosphere.

3. The apparatus of claim 1 further comprising means for controlling the level of the mixture in the first chamber.

4. The apparatus of claim 1 wherein the means for facilitating communication between the upper region of the first chamber and the outlet of the aspirator is a conical conduit.

5. A distillation device for separating a liquid from contaminants contained therein, comprising:

a. a first chamber for containing the contaminated liquid;

b. heating means associated with the chamber for boiling the contaminated liquid;

c. a second chamber, partitioned from the first chamber and connected thereto by pressure-equalizing means, for containing the liquid free of contaminants;

d. an aspirator coupled to the second chamber;

e. a conduit for withdrawing the liquid from the second chamber and conveying the liquid to the aspirator;

f. means for facilitating vapor communication between the upper region of the first chamber and the inlet of the aspirator, thereby facilitating contact between vapor from the first chamber and liquid ejected from the aspirator; and g. means for cooling the liquid withdrawn from the second chamber before it reaches the aspirator, thereby providing a cooled source of aspirated liquid which mades contact with and condenses vapor from the first chamber, wherein the conduit is disposed with respect to the aspirator so as to create a venturi that withdraws vapor from the first chamber into the aspirator.

6. The apparatus of claim 5 wherein the cooling means is a temperature-controlled air radiator in an atmosphere having a dew point, the temperature of the radiator remaining above the dew point of the atmosphere.

7. The apparatus of claim 5 wherein the means for facilitating communication between the upper region of the first chamber and the outlet of the aspirator is a conical conduit.

* * * * *